United States Patent [19]

Mueller

[11] 4,101,739

[45] Jul. 18, 1978

[54] DEMULTIPLEXER FOR ORIGINALLY SYNCHRONOUS DIGITAL SIGNALS INTERNESTED WORD-WISE

[75] Inventor: Horst Mueller, Hohenschaeftlarn, Germany

[73] Assignee: Siemens Aktiengesellschaft, Berlin & Munich, Germany

[21] Appl. No.: 759,351

[22] Filed: Jan. 14, 1977

[30] Foreign Application Priority Data

Jan. 27, 1976 [DE] Fed. Rep. of Germany ....... 2602937

[51] Int. Cl.² .............................................. H04J 3/04
[52] U.S. Cl. ................................. 179/15 A; 179/15 AF
[58] Field of Search ............ 179/15 A, 15 BL, 15 BS, 179/15 BW, 15 AF

[56] References Cited

U.S. PATENT DOCUMENTS

| 3,705,266 | 12/1972 | Philip | 179/15 AT |
| 3,829,843 | 8/1974 | Cichetti | 179/15 AF |
| 3,970,799 | 7/1976 | Colton | 179/15 AF |

Primary Examiner—David L. Stewart
Attorney, Agent, or Firm—Hill, Gross, Simpson, Van Santen, Steadman, Chiara & Simpson

[57] ABSTRACT

A time division demultiplexer for demultiplexing synchronous digital signals which are interleaved word-wise comprising a shift register of length $(m + 1) \cdot n$, where $n$ is the number of bits/word and $m$ is the number of interleaved signals, having a control unit and a first and second store having a total capacity of $m \cdot n$ bits and each having $m$ parallel inputs and $m$ outputs; said shift register having an output tap every $n$ bits, said first store having $m \cdot q$ storage elements and said second store having $m \cdot r$ storage elements, where $q$ and $r$ are integers and $q + r = n$; said first store being loaded by the first $q$ bits of $m$ words appearing at said shift register input point and on the succeeding $m - 1$ of said taps counting from said input point of said shift register; said second store being loaded with the second $r$ bits of said $m$ words appearing at said output point and the preceding $m - 1$ of said taps of said shift register; said second store being loaded approximately $(m \cdot n/2)$ pulses after said first store is loaded; said respective outputs of said first and second stores being tied together and a first $q$ bits of $m$ words being read out in parallel from said first store followed by a second $r$ bits of said $m$ words being read out in parallel from said second store.

5 Claims, 6 Drawing Figures

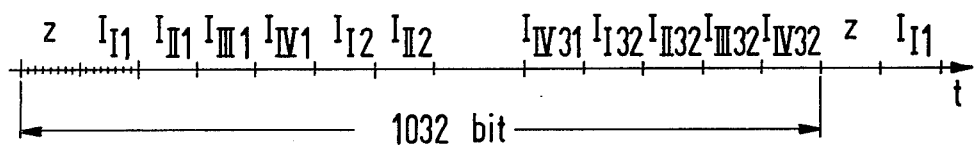
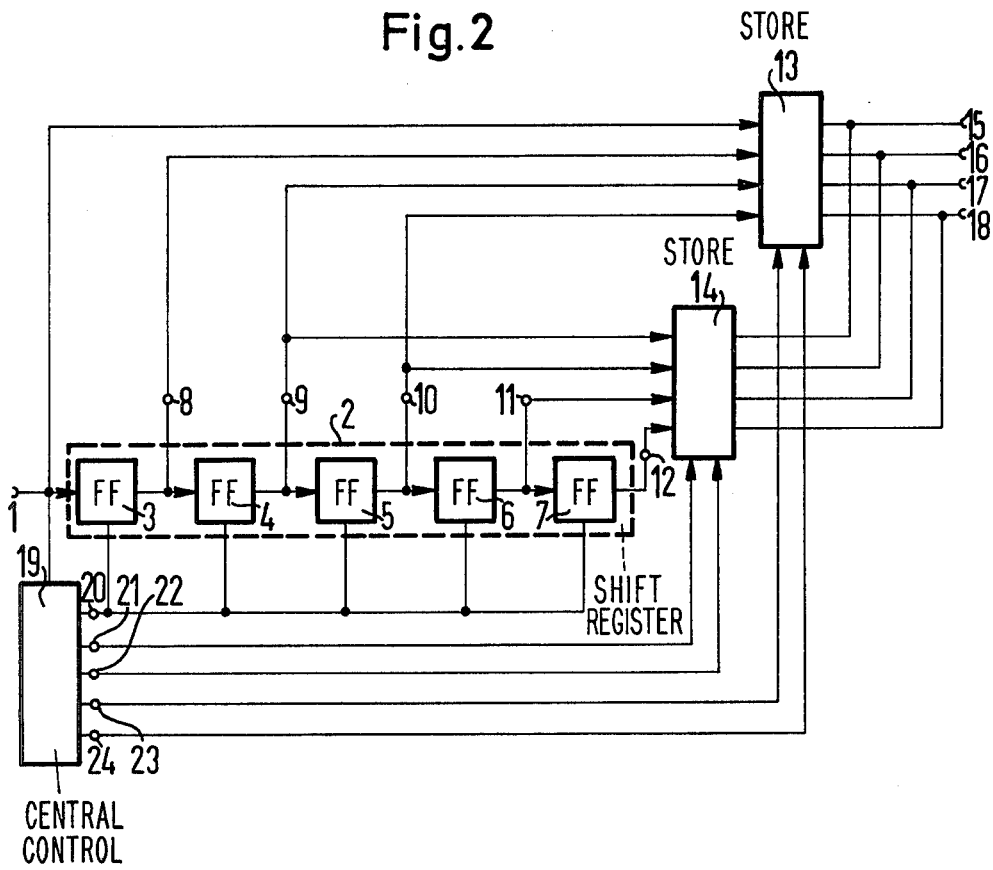

DEMULTIPLEXER FOR ORIGINALLY SYNCHRONOUS DIGITAL SIGNALS INTERNESTED WORD-WISE

BACKGROUND OF THE INVENTION

This invention relates to a demultiplexer for originally synchronous digital signals which are internested word-wise, with $m$ words per smallest frame and $n$ bits per word, and containing a shift register at the input end.

In digital time division multiplexers processes in which primary signals which are synchronous to one another are internested word-wise and additional signals which are to be additionally transmitted are inserted, the information bits of a primary signal are non-uniformly distributed in the multiplex signal to a marked degree. Therefore, the restoration of a uniform primary signal in the demultiplexer at the receiving end requires extensive intermediate stores which compensate the non-uniform distribution of the information bits.

German published patent application 2 336 286 discloses such a demultiplexer which consists of $m$ shift registers, $m$ stores and $m$ parallel-series converters.

A positive stuffing process has been recommended which combines four 2048 kbit/s signals to form one 8448 kbit/s signal. A process variant provides that four synchronous primary signals are internested bit-wise. In addition word-wise internesting for example for a transmission between PCM exchanges can also be effective.

BRIEF SUMMARY OF THE INVENTION

The aim of the invention is to construct a demultiplexer requiring only a few storage positions for a time division multiplexing system of a higher hierarchy stage.

Commencing from a demultiplexer for originally synchronous digital signals internested word-wise, with $m$ words per smallest frame and $n$ bits per word, containing a shift register at the input end, this aim is realized in accordance with the invention by constructing the multiplexer as follows: A shift register, comprising $(m + 1) \cdot n$ stages, is provided which exhibits a tapping every $n$ bits. A first store and a second store having $m$ inputs and $m$ outputs are provided, that both stores together possess an $n$ number of stages. The latter is at least approximately divided in equal parts between the two stores. The input and the $m - 1$ input-end tappings of the shift register are connected consecutively in the transmission direction of the latter in each case to an input of the first store, commencing with the first input. The $m - 1$ output-end tappings and the output of the shift register are connected consecutively in the transmission direction of the latter, in each case to an input of the second store, commencing with the first input. The outputs of the two stores are connected in parallel. A pulse train central control is provided which produces a shift register pulse train which produces a first store input pulse train and which every $m \# n$ steps completely fills the first store in stages. This in turn produces a second store input pulse train which is delayed in relation to the first store input pulse train by approximately $(m \cdot n)/2$. The latter completely fills the second store in stages every $m \cdot n$ steps, and which produces a first and second store output pulse train which consecutively opens the store outputs of the first store and of the second store cyclically at equal intervals of time.

Making reference to an exemplary embodiment, the invention will be explained in detail in the following.

BRIEF DESCRIPTION OF THE DRAWINGS

FIG. 1 shows the pulse frame of a multiplex signal;
FIG. 2 diagrammatically illustrates a demultiplexer in accordance with the invention.

DESCRIPTION OF A PREFERRED EMBODIMENT

Figure 3:
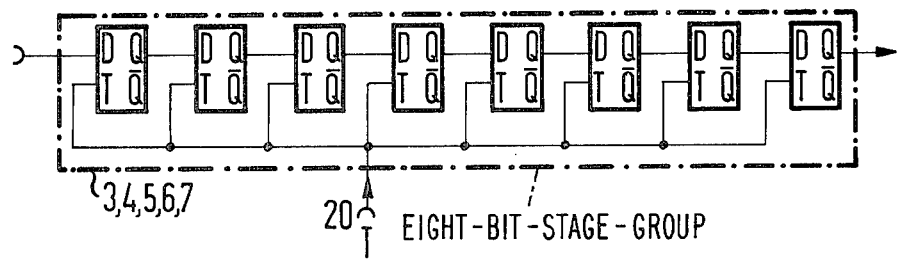
FIG. 3 diagrammatically shows an eight-bit shift register.

FIG. 1 illustrates a pulse frame of 1032 bits length. The pulse frame commences with the additional information $z$ for synchronizing and message purposes, having a length of eight bits. This is followed, internested word-wise, by the digital signals of four originally synchronous digital signals. I in each case designates a word having a length of eight bits, the Roman numerals I to IV marking the four digital signals and the Arabic numerals 1 to 32 characterizing the smallest frames which are in each case composed of one word of each of the four digital signals.

FIG. 2 illustrates a demultiplexer in accordance with the invention. The latter contains an input 1, a shift register 2 with eight-bit-stage-groups 3 to 7 with tappings 8 to 11, and with an output 12, a first store 13 and a second store 14, in each case with outputs 15 to 18 (see FIG. 4), which simultaneously serve as demultiplexer outputs, and a pulse train central control 19 with outputs 20 to 24.

FIG. 3 illustrates one of the eight-bit-stage-groups 3 to 7 of the shift register 2.

Figure 4:
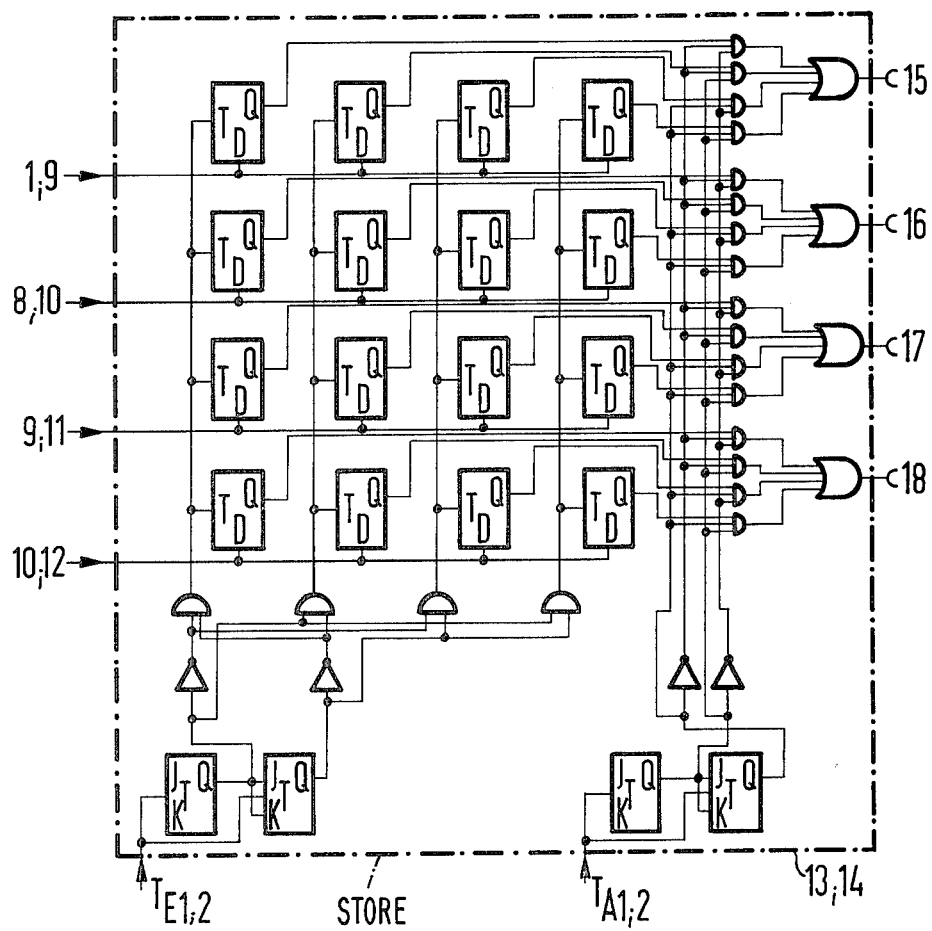
FIG. 4 shows a store.

FIG. 4 shows a store 13, 14. The latter contains $4 \cdot 4$ storage elements. Write-in into the store is effected in such a manner that a store input timing pulse $T_{E1}$ and $T_{E2}$ simultaneously in each case inserts four bits into the store 13, 14 respectively. Read-out takes place in that a store output timing pulse $T_{A1}$ and $T_{A2}$, simultaneously in each case, outputs four bits at the outputs 15 to 18.

Figure 5:
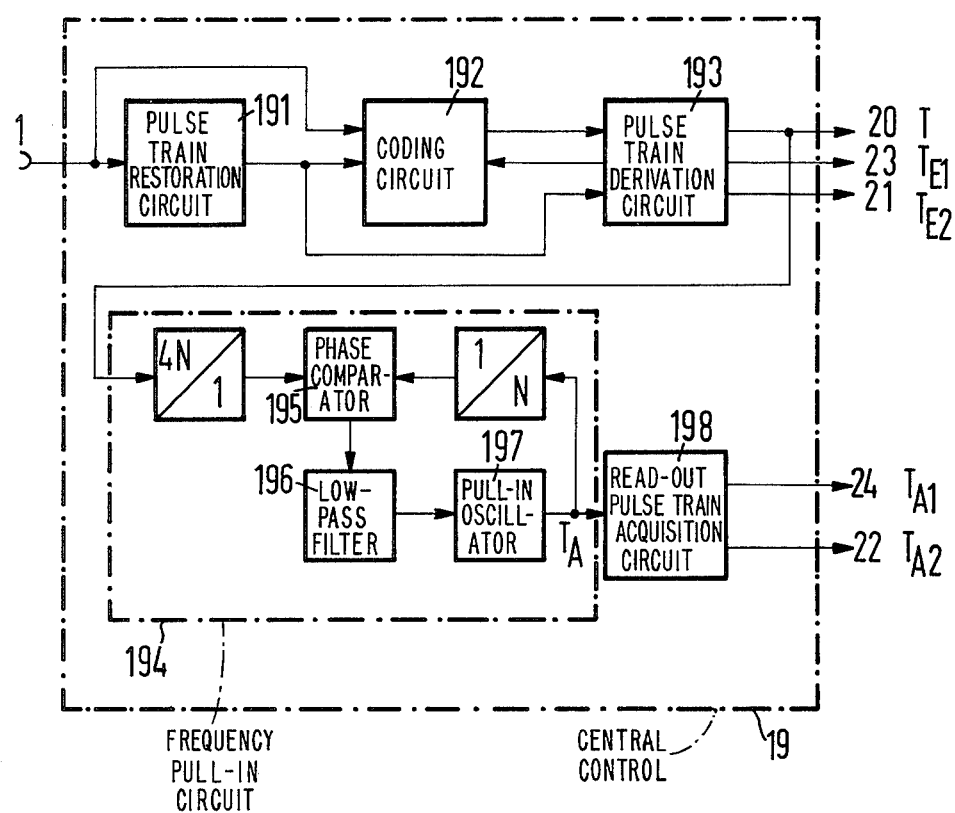
FIG. 5 shows a pulse train central control.

FIG. 5 illustrates the pulse train central control 19. A pulse train restoration circuit 191 derives the multiplex pulse train from the multiplex signal, incoming at the input 1, in a pulse train restoration circuit 191. A following frame coding circuit 192 is synchronized in accordance with known processes (see U.S. Pat. No. 3,461,245 and U.S. Pat. No. 3,136,861) by means of the additional information $z$ contained in the pulse frame to the beginning of the pulse frame and brings a pulse train derivation circuit 193 into a correct phase state to the multiplex signal. The pulse train derivation circuit 193 contains frequency divider modules (flip-flops), which divide down the multiplex pulse train by the factor 1032 and logic linking elements for producing the pulse trains which will be described in the following. The pulse train derivation circuit 193 supplies, at its output 20, a pulse train T which corresponds to the multiplex pulse train but is held for the duration of the additional information $z$ in the multiplex signal, as can be seen from FIG. 6. The pulse train derivation circuit 193 also supplies, at its outputs 23, 21, groups of, in each case, four store input timing pulses $T_{E1}$ and $T_{E2}$. The timing pulses $T_{E2}$ are delayed by twenty pulse train periods TP of the multiplex signal in relation to the timing pulses $T_{E2}$. In a frequency pull-in circuit 194, including a phase comparator 195, a low-pass filter 196 and a pulled-in oscillator 197, such as described for example on pages 559 to 602 of the March edition 1962 of the technical publication "The Bell System Technical Journal," a uniform read-out pulse train $T_A$ is obtained from the four times faster pulse train T exhibiting gaps and from this the two store output pulse trains $T_{A1}$ and $T_{A2}$ are obtained in the read-out pulse train acquisition circuit 198.

Figure 6:
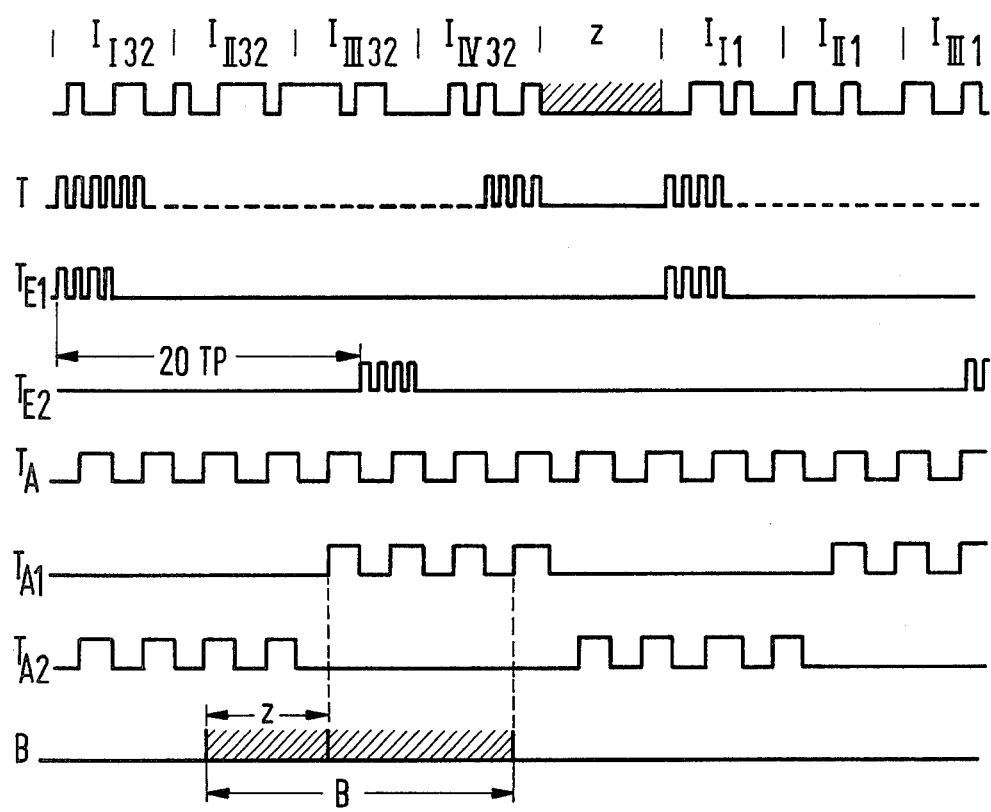
FIG. 6 shows a pulse plan for the demultiplexer corresponding to FIG. 2.

The mode of operation of the demultiplexer will be explained in the following making reference to the pulse plan in FIG. 6.

Without the additional information z for synchronizing and message purposes, contained in the multiplex signal, the information bits of the primary signals are input via the input 1 into the shift register 2 with a pulse train T produced by the pulse train central control 19 and emitted at the output 20. This pulse train corresponds to the pulse train of the multiplex signal, but is held for the duration of the additional information z in the multiplex signal — as illustrated in FIG. 6. The information bits of the primary signals are input, with the store input timing pulses $T_{E1}$ and $T_{E2}$ into the stores 13 and 14, each of which have a capacity of four times four bits. The input is effected in such a manner that a store input timing pulse $T_{E1}$ and $T_{E2}$ each simultaneously introduce four bits into the store 13 and 14, respectively. As a result of the delay in the shift register 2 by in each case eight bits, the four store input timing pulses $T_{E1}$ each consecutively input the first, second, third and fourth bits of a word of the four primary signals into the store 13. The four store input timing pulses $T_{E2}$ are delayed by twenty pulse train periods TP of the multiplex signal in relation to the store input timing pulses $T_{E1}$ and input the fifth, sixth, seventh and eighth bits of the same word into the store 14. The first store input pulse train $T_{E2}$ is emitted at the output 21. The read-out from the store 13 and 14 is effected with store output pulse trains $T_{A1}$ and $T_{A2}$ which are emitted from the pulse train central control 19 at the outputs 24 and 22. During a super-frame of the multiplex signal comprising 1032 bits, a phase shift of the length of the additional information z occurs between the store input timing pulses $T_{E1}$ and $T_{E2}$ and the associated store output timing pulses $T_{A1}$ and $T_{A2}$. The zone B in Figure 6 in which the positive pulse train flanks of the pulse parcel, belonging to the store input pulse train $T_{E1}$, of the store output pulse train $T_{A1}$ can move during a super-frame, is shown in the lower part of FIG. 6. Corresponding also applies to the assignment of the store output timing pulses $T_{A2}$ to the store input timing pulses $T_{E2}$.

It will be apparent to those skilled in the art that many modifications and variations may be effected without departing from the spirit and scope of the novel concepts of the present invention.

I claim as my invention:

1. A time division demultiplexer for demultiplexing synchronous digital signals which are interleaved wordwise comprising a shift register of length $(m + 1) \cdot n$, where n is the number of bits/word and m is the number of interleaved signals, having a control unit and a first and second store having a total capacity of $(m \cdot n)$ bits and each having m parallel inputs and m outputs; said shift register having an output tap every n bits; said first store having $m \cdot q$ storage elements and said second store having $m \cdot r$ storage elements where q and r are integers and $q + r = n$; said first store having means for receiving and storing the first q bits of m words as they appear at said shift register input point and on the succeeding $m - 1$ of said taps, said second store having means to receive and be loaded by the second r bits of said m words as they appear at said output point and the preceding $m - 1$ of said taps of said shift register and said second store being loaded approximately $m \cdot n/2$ pulses after the first store is loaded, said respective outputs of said first and second stores being connected together, and means for reading out in parallel the first q bits of m words from said m words in parallel from said m words.

2. A demultiplexer suited for demultiplexing a time division multiplexed signal having m synchronous signals multiplexed together on a word basis with n bits per word comprising an input terminal for the multiplexed signal, a shift register having an input point, an output point, a shift input terminal, $(m + 1) \cdot n$ storage positions with an output tap every n storage positions, a first and second store each having m parallel inputs, m parallel outputs, a store input timing line, a store output timing line, both of said stores together having a storage capacity of $n \cdot m$ bits and said storage capacity being approximately equally divided between said first and second stores, having also a pulse train control with an input terminal, an output shift terminal, first and second store input terminals and first and second store output terminals; said input terminal for the multiplexed signal being connected to said input terminal of said pulse train control, to said input point of said shift register and to one of said m parallel inputs of said first store; having m − 1 of said taps of said shift register, counting from the input end of said shift register, connected to the remaining of said m parallel inputs to said first store; having said output point of said shift register connected to one of said m parallel inputs of said second store and having m − 1 of said taps of said shift register, counting from the output end of said shift register, connected to the remaining of said m parallel inputs of said second store, having corresponding of said output lines of said first and second stores connected together; said output shift terminal of said pulse train control being connected to said shift input terminal of said shift register, said first and second store output terminals of said pulse train control being connected to said store input timing lines of said first and second stores, said first and second store output terminals of said pulse train control being connected to said store output timing lines of said first and second stores; said pulse train control having means to produce trains of shift pulses at said shift input terminal of said shift register and at said first and second store input timing lines of each of said first and second stores, means for filling said first store with pulses on said corresponding input timing line every $(m \cdot n)$ shift pulses on said shift input terminal of said shift register, means for delaying the filling of said second store with respect to the filling of said first store by approximately $(m \cdot n)/2$ shift pulses, means to produce a series of pulses on said first and second store output terminals connected to said store output timing lines of said first and second stores in response to said pulse train control such that the contents of said first and second stores are consecutively read out in parallel m bits at a time.

3. The demultiplexer according to claim 2, wherein the value of m equals 4 and the value of n equals 8.

4. The method of demultiplexing a synchronous word interleaved signal composed of m input signals with n bits for each interleaved word having as a first step storing the input signal into a shift register of capacity $(m + 1) \cdot n$ bits with a tap after each $n$ bits; having as a second step reading the first q bits of each of $m$ words using the shift register input and $m - 1$ succeeding consecutive taps, counting from the shift register input point, into a first $m$ bit wide by $q$ bits deep store; having as a third step shifting the contents of the shift register another approximately $m \cdot n/2$ bits and reading the last $r$ bits of each of $m$ words from the shift register using the output of the shift register and $m - 1$ preceding consecutive taps counting from the shift register output point into a second $m$ bits wide by $r$ bits deep store; having as a fourth step reading out in parallel from the first store the first $q$ bits of each word and from the second store the last $r$ bits of each of the $m$ words.

5. The method according to claim 4, wherein the value of $m$ equals 4 and the value of $n$ equals 8, and $q = r = 4$.

* * * * *